(12) United States Patent
Gupta et al.

(10) Patent No.: US 10,356,075 B2
(45) Date of Patent: Jul. 16, 2019

(54) AUTOMATED VERIFICATION OF CHAINS OF CREDENTIALS

(71) Applicant: International Business Machines Corporation, Armonk, NY (US)

(72) Inventors: Rahul Gupta, Austin, TX (US); David B. Kumhyr, Austin, TX (US); Hari H. Madduri, Austin, TX (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 15/459,669

(22) Filed: Mar. 15, 2017

(65) Prior Publication Data

US 2018/0270242 A1    Sep. 20, 2018

(51) Int. Cl.
| | | |
|---|---|---|
| *G06F 21/00* | (2013.01) | |
| *H04L 29/06* | (2006.01) | |
| *H04W 12/06* | (2009.01) | |
| *H04W 4/21* | (2018.01) | |

(52) U.S. Cl.
CPC ............... *H04L 63/08* (2013.01); *H04W 4/21* (2018.02); *H04W 12/06* (2013.01)

(58) Field of Classification Search
CPC ...................................................... H04L 63/08
USPC ............................................................ 726/6
See application file for complete search history.

(56) References Cited

U.S. PATENT DOCUMENTS

| | | | |
|---|---|---|---|
| 7,213,262 B1 | 5/2007 | Elley et al. | |
| 7,222,346 B2* | 5/2007 | Lenormand | G06F 9/4843 718/104 |
| 8,140,843 B2 | 3/2012 | Holtzman et al. | |
| 8,505,078 B2* | 8/2013 | Hohlfeld | G06F 21/6218 726/27 |
| 8,812,690 B1* | 8/2014 | Ramesh | G06F 17/30893 705/319 |
| 9,055,107 B2 | 6/2015 | Medvinsky et al. | |
| 9,363,283 B1* | 6/2016 | Herrera-Yague | H04L 63/1425 |
| 9,438,619 B1* | 9/2016 | Chan | G06F 16/24578 |

(Continued)

OTHER PUBLICATIONS

Anonymously; "Protocol for Enabling Secure Smart Home Network Communication in IoT"; http://ip.com/IPCOM/000247757D; Oct. 6, 2016; 6 pages.

(Continued)

*Primary Examiner* — Harris C Wang
(74) *Attorney, Agent, or Firm* — Reza Sarbakhsh; Edell, Shapiro & Finnan, LLC

(57) ABSTRACT

A method, a computing system and a computer program product are provided. A computing device identifies a credential of a first entity and determines one or more second entities, each electronically verifying the credential of the first entity. The computing device determines one or more third entities, each electronically verifying one or more from a group of second entities and other ones of the third entities, wherein the second and third entities form a set of chains of verification from the first entity. The computing device analyzes the set of chains of verification to detect one or more loops within the set of chains among the second and third entities. A verification of the credential is generated by the computing device based on detection of a trusted entity within one of the set of chains and not detecting a loop within the one of the set of chains.

18 Claims, 5 Drawing Sheets

(56) References Cited

U.S. PATENT DOCUMENTS

| | | | | |
|---|---|---|---|---|
| 2009/0076994 | A1* | 3/2009 | Ghosh | G06N 5/00 706/46 |
| 2009/0150166 | A1* | 6/2009 | Leite | G06Q 10/105 705/320 |
| 2009/0276233 | A1* | 11/2009 | Brimhall | G06Q 30/02 705/38 |
| 2010/0005099 | A1* | 1/2010 | Goodman | G06F 21/62 707/E17.005 |
| 2010/0332405 | A1* | 12/2010 | Williams | G06Q 10/06 705/319 |
| 2012/0182882 | A1* | 7/2012 | Chrapko | G06Q 30/02 370/248 |
| 2012/0317200 | A1* | 12/2012 | Chan | G06N 7/005 709/204 |
| 2013/0090980 | A1* | 4/2013 | Hummel | G06Q 50/01 705/7.29 |
| 2014/0090036 | A1 | 3/2014 | Roberts | |

OTHER PUBLICATIONS

Locher, T. et al.; "Automated Certificate Management for Industry 4.0 & Industrial Internet"; http:/ip.com/IPCOM/000242200D; Jun. 25, 2015; 10 pages.

Siemens et al.; "Trusted Interactive Workflow with Distributed Control and Evidence of Event Chain"; http://ip.com/IPCOM/000141043D; Sep. 29, 2006.

* cited by examiner

AUTOMATED VERIFICATION OF CHAINS OF CREDENTIALS

BACKGROUND

Present invention embodiments are related to systems, methods and computer program products for automating verification of one or more chains of credentials. In particular, present invention embodiments relate to systems, methods and computer program products for automating verification of one or more chains of credentials for entities and for detecting loops in the chains as well as other conflicts of interest.

Often people falsify credentials on their resumes in order to gain an edge in a competitive job market. This could be a critical problem if the falsified credentials include professional credentials such as credentials of a medical professional. Before making a donation to a charity, people may wish to verify the credentials of the charity to determine whether the charity is legitimate or a scam. Before investing in a business or organization, one would like to certify whether the business, the organization, or a person with whom one may do business is trustworthy.

In online career networks, people may be asked to endorse their peers regarding knowledge in certain fields. Generally, these endorsements are not verified, thereby making the endorsements unreliable. Further, some people offer an endorsement to others in return for an endorsement that is not verified. Because the endorsement is unverified, an endorser could provide an endorsement regarding subject matter with which the endorser is totally unfamiliar.

Often, verification of credentials may be attempted by performing a simple search for credentials using a popular search engine. However, people familiar with search techniques know that such verifications can be falsified and biased by unverifiable credentials.

Some people may rely on social networks to verify authenticity of people, organizations and charities. However, verifying entities on the social network may often be unknown and verification of the verifying entities' credentials may be difficult or impossible.

SUMMARY

In a first aspect of the invention, a machine-implemented method is provided for verifying a credential of an entity. A computing device identifies a credential of a first entity and determines one or more second entities, each of which electronically verify the credential of the first entity. The computing device determines one or more third entities, each of which electronically verifies one or more from a group of the second entities and other ones of the third entities, wherein the second and third entities form a set of chains of verification from the first entity. The computing device analyzes the set of chains of verification to detect one or more loops within the set of chains among the second and third entities. A verification of the credential is generated based on detection of a trusted entity within one of the set of chains and not detecting a loop within the one of the set of chains.

In a second aspect of the invention, a computing system is provided for verifying credentials of an entity. The computing system includes at least one processor and at least one memory connected to the at least one processor. The at least one processor is configured to perform: identifying a credential of a first entity; determining one or more second entities, each electronically verifying the credential of the first entity; determining one or more third entities, each electronically verifying one or more from a group of the second entities and other ones of the third entities, wherein the second and third entities form a set of chains of verification from the first entity; analyzing the set of chains of verification to detect one or more loops within the chains among the second and third entities; and generating a verification of the credential based on detection of a trusted entity within one of the set of chains and not detecting a loop within the one of the set of chains.

In a third aspect of the invention, a computer program product is provided. The computer program product includes at least one computer readable storage medium having computer readable program code embodied therewith for execution on at least one processor. The computer readable program code is configured to be executed by the at least one processor to perform: identifying a credential of a first entity; determining one or more second entities, each electronically verifying the credential of the first entity; determining one or more third entities, each electronically verifying one or more from a group of the second entities and other ones of the third entities, wherein the second and third entities form a set of chains of verification from the first entity; analyzing the set of chains of verification to detect one or more loops within the chains among the second and third entities; and generating a verification of the credential based on detection of a trusted entity within one of the set of chains and not detecting a loop within the one of the set of chains.

BRIEF DESCRIPTION OF THE DRAWINGS

Generally, like reference numerals in the various figures are utilized to designate like components.

DETAILED DESCRIPTION

Figure 1:
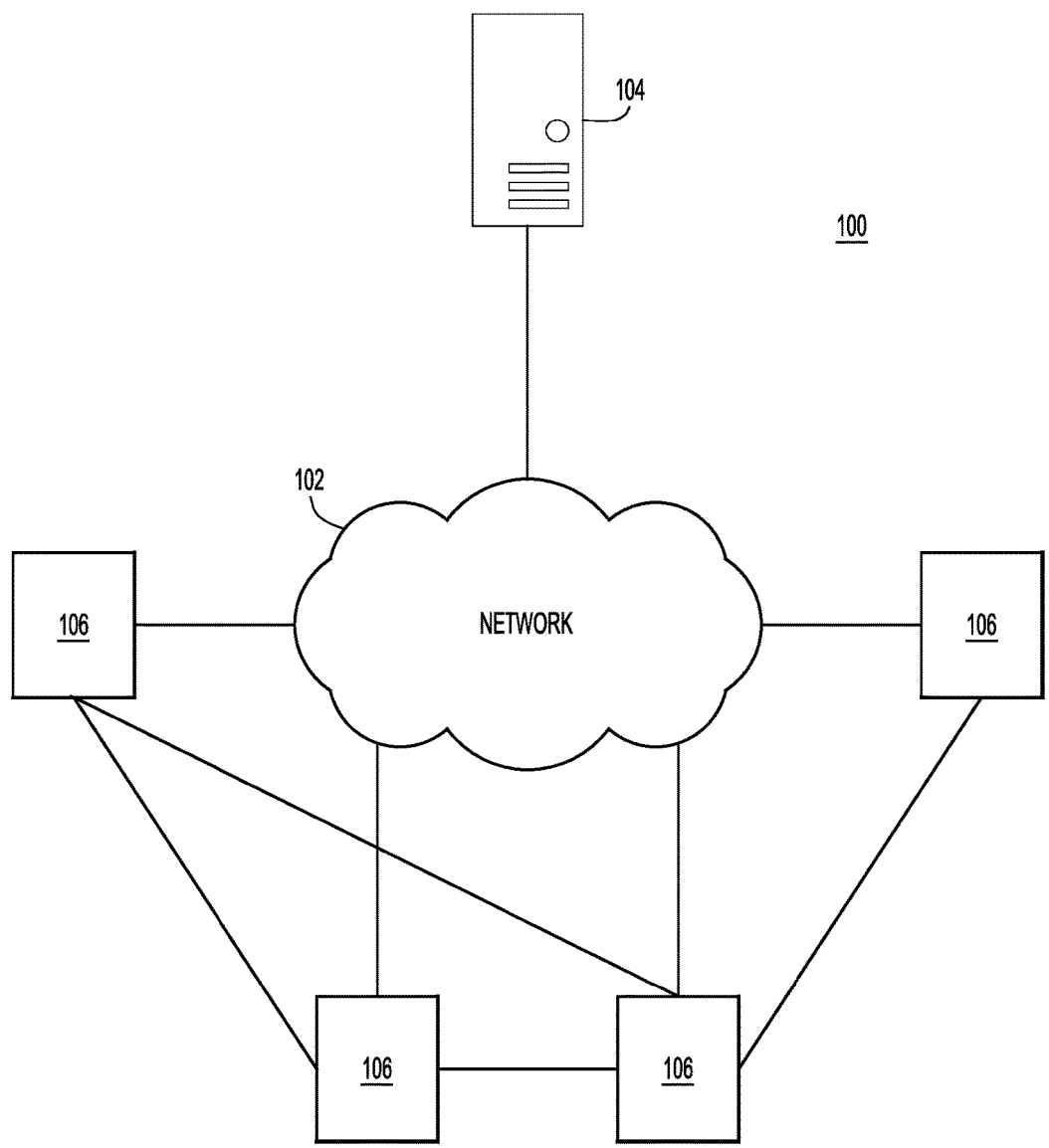
FIG. 1 illustrates an example environment for implementing various embodiments of the invention.

Present invention embodiments include methods, computing systems and computer program products for identifying a credential of a first entity, generating data corresponding to a node representing the identified credential of the first entity, determining whether a current node represents a terminal node (a node of a trusted entity) or whether a count of nodes in a current chain of credentials is equal to a preset limit. When a current node is determined to be a terminal node, the current chain of nodes is marked as verified. When a current node is determined to be an Nth node in the current chain of nodes, where N is an integer equal to the preset limit, the current chain of credentials is marked as unverified. For each entity represented by a node, one or more vouching entities that electronically verify the credential of a current entity, represented by the current node, may be determined. One of the one or more vouching entities may be selected and a determination may be made regarding whether a credential of the selected vouching entity is associated with a subject matter associated with the current node. If the credential of the selected vouching entity is not associated with the subject matter associated with the current node, then data corresponding to the selected vouching entity may be removed. Further, all data corresponding to vouching entities included in chains of verification that include the selected vouching entity, which verifies the current node, may be removed. A determination may be made regarding whether another chain of verifications exists at a same depth of the chain and begins with an entity that vouches for a credential of the current entity represented by the current node. If the other chain of verifications exists, then a credential of the vouching entity may be selected.

When a subject matter of the credential of the vouching entity corresponds to a subject matter of the credential of the entity represented by the current node, then a determination may be made regarding whether a loop is detected. A loop exists when, within a chain of verifications, a first entity credential is vouched for by a second entity credential that appears more than once in the chain of credentials. One example of such a loop includes A->B->C->D->E->A, where A through E are entity credentials and -> indicates that the entity to the left of -> is vouched for by the entity appearing to the right of ->.

Various embodiments are able to detect hierarchies in organizations. For example, a conflict may be determined when a vouching entity is determined to have a relationship with a vouched for entity in the chain of verifications. One example of such a relationship includes a case in which person A, who is a highest decision maker in organization X is also the owner of organization Y and (X->Y or Y->X).

In some embodiments, a trust score may be computed for an entity, where positive and negative points may be assigned to each entity vouching for a particular entity. When a loop or other conflict of interest relationship is detected in a chain of credentials from a vouching entity, negative points may be assigned to the vouching entity. The trust score for an entity maybe determined by summing the scores of each of the vouching entities.

FIG. 1 shows an example environment 100 in which various embodiments may be implemented. The example environment may include a network 102, a server 104, and a number of other computing devices 106. Network 102 may include a local area network (LAN), a wide area network (WAN), a public switched data network (PSDN), a wireless network, a wired network, the Internet, an intranet, other types of networks, or any combination of the above. In some embodiments, at least some computing devices 106 may include Internet of Things (IoT) devices 106 or may include other types of computing devices including, but not limited to, servers, routers, client devices and host devices. Server 104 and computing devices 106 may be connected to network 102. In addition, some computing devices 106 may be connected with other computing devices 106 either via a wired or wireless connection. In some embodiments, one of computing devices 106 may be substituted for server 104.

IoT devices are physical devices, vehicles, buildings, or other items that are internetworked and embedded with electronics, software, sensors, actuators and network connectivity that enable these objects to collect and exchange data.

Figure 2:
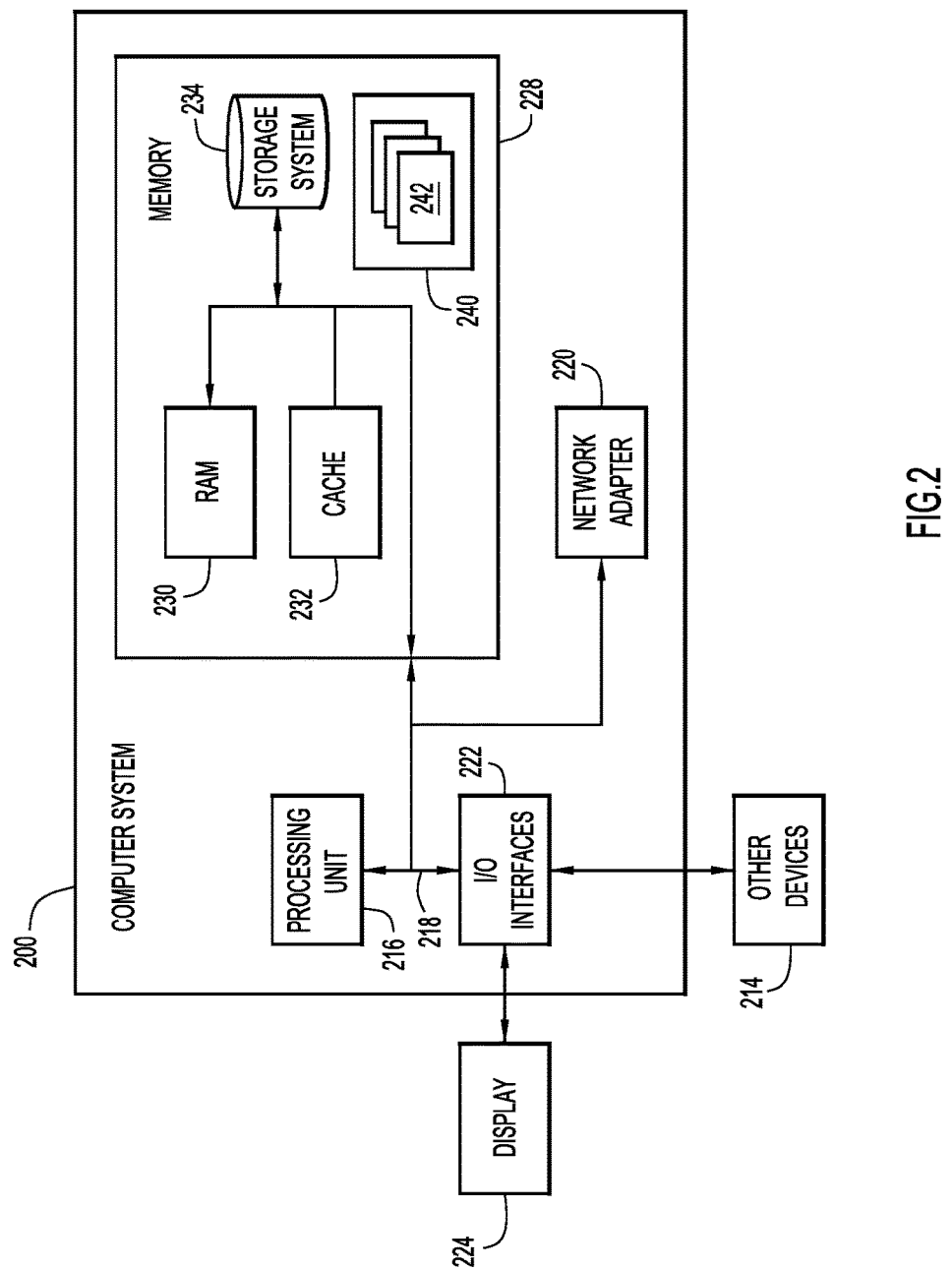
FIG. 2 illustrates a functional block diagram of at least a portion of a computing system on which embodiments of the invention may be implemented.

FIG. 2 illustrates at least a portion of a computing system 200, which may function as server 104 and/or computing device 106 which may implement embodiments of the invention. Computing system 200 may include, but not be limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 typically includes a variety of computer system readable media. Such media may be any available media that is accessible by computing system 200, and includes both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. Storage system 234 may include other types of storage for reading and writing including, but not limited to, flash memory and Secure Digital (SD) card. Storage system 234 can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, a display 224, etc.; one or more devices that enable a user to interact with computing system 200; and/or any devices (e.g., network card, modem, etc.) that enable computer system 200 to communicate, either wired or wirelessly, with one or more other computing systems. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with other components of computing system 200 via bus 218. It should be understood that, although not shown, other hardware and/or software components could be used in conjunction with computing system 200. Examples, include, but are not limited to: microcode, device drivers, and redundant processing units, etc.

Figure 3:
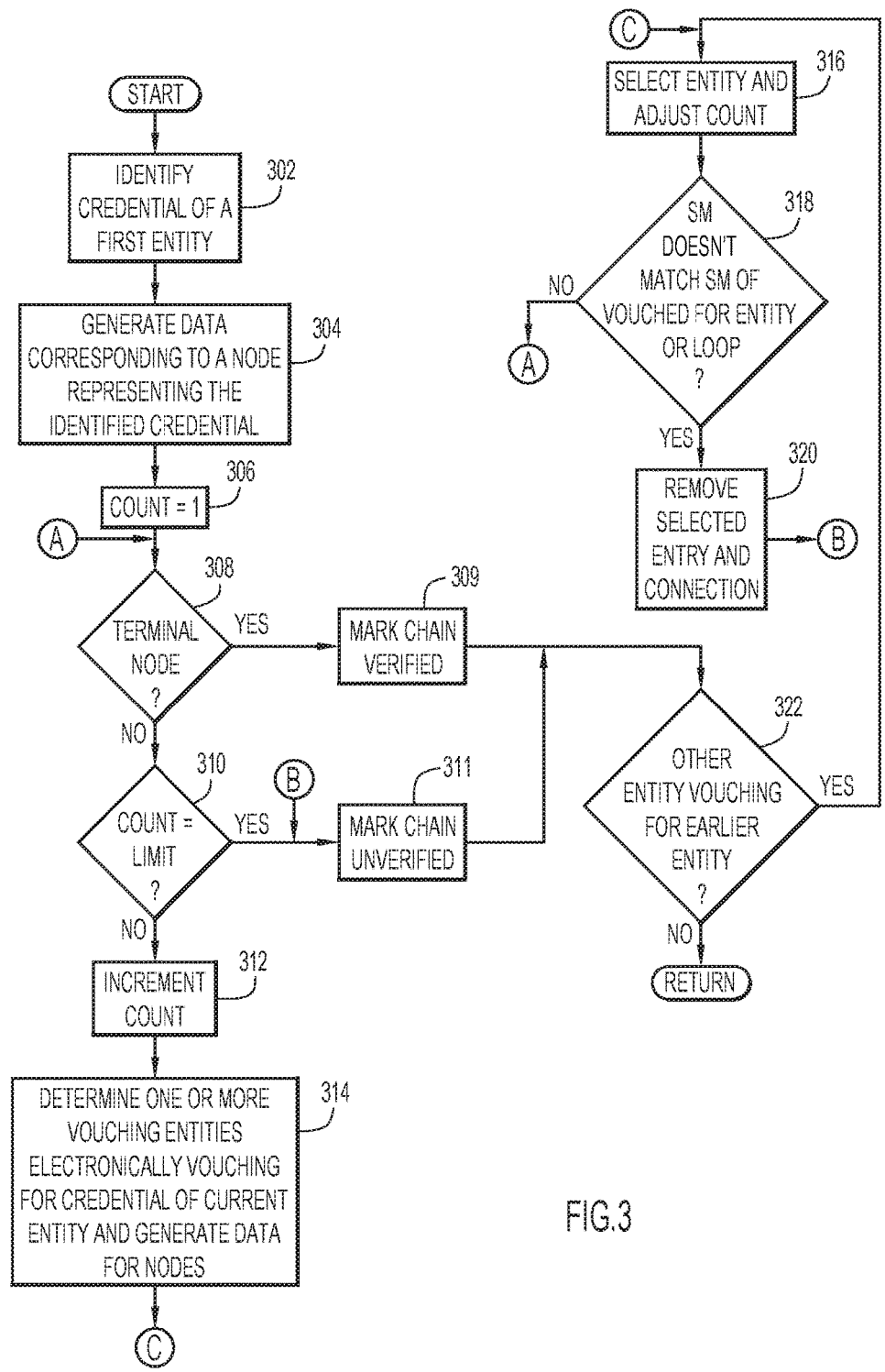
FIG. 3 is a flowchart of a process that may be performed in various embodiments to verify a set of chains of verification.
Figure 4:
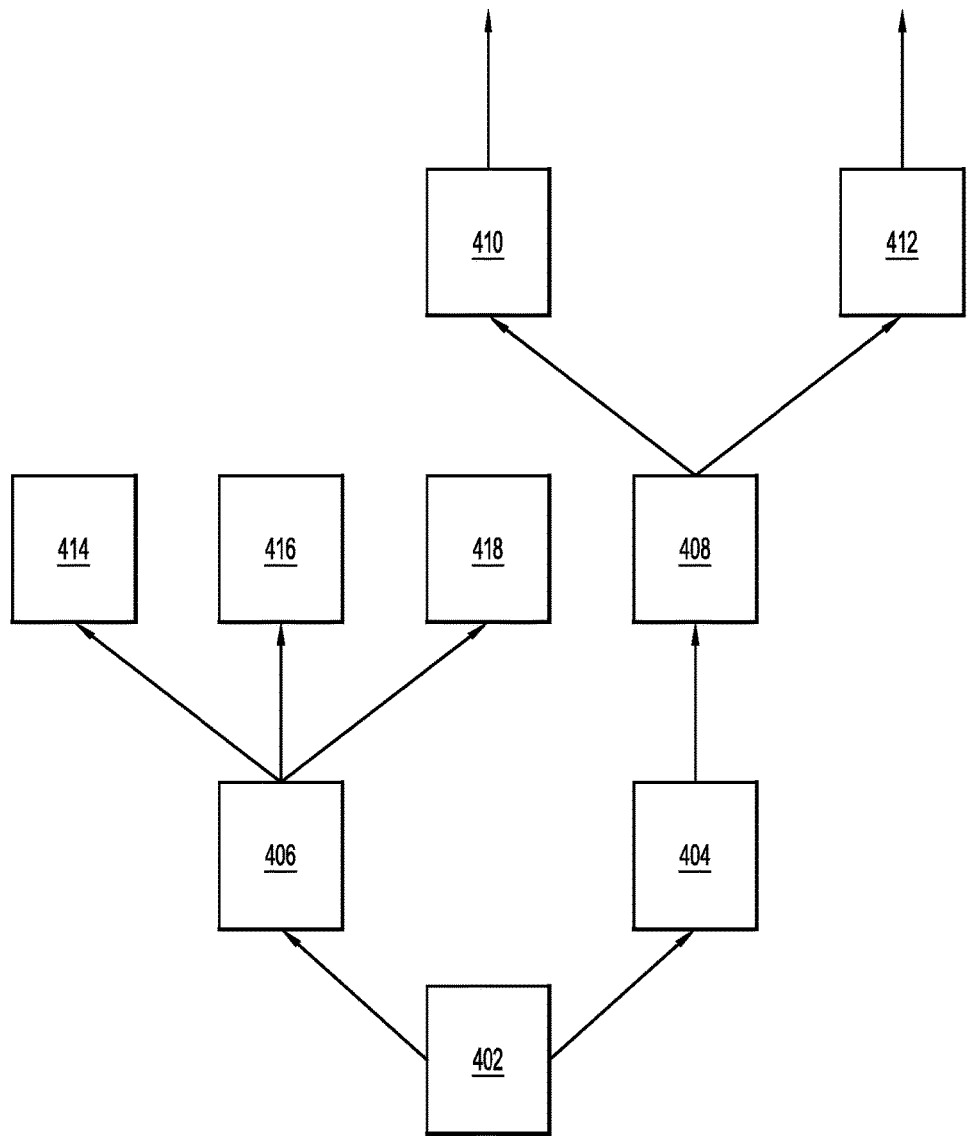
FIG. 4 illustrates a portion of an example set of chains of verification in embodiments of the invention.

FIG. 3 is a flowchart of an example process that may be performed by a computing device such as server 104 or computing device 106. The process may begin with the computing device identifying a credential of a first entity (act 302). In various embodiments, an entity may include, but not be limited to, a person, an organization, a certifiable object or an IoT device. The computing device may receive the credential of the first entity from another computing device via a network to which the computing device is connected. The computing device may generate data corresponding to a node, which represents the first entity, in a graphical representation (act 304). FIG. 4 shows node 402 representing the first entity in a graphical representation. A counter for counting a depth of nodes in a chain of verifications may be initialized to one (act 306).

Next, the computing device may determine whether node 402 is a terminal node (act 308). Various embodiments may include two types of terminal nodes: a terminal node representing a trusted entity and a precomputed terminal node. The terminal node may be an entity which is considered to be a trusted accreditation authority. For example, an accredited university or a person with a verifiable degree from an accredited university can be a terminal node. A precomputed terminal node is an entity having a credential that has been precomputed as verified. Precomputed terminal nodes and terminal nodes may not be explored any further when verifying credentials. With respect to the chain of verifications of FIG. 4, during act 308, node 402 is determined not to be a terminal node or a precomputed terminal node. The counter for counting a depth of a chain of verifications may be checked to determine whether a value of the counter is equal to a preset limit (act 310). The pre-set limit, in some embodiments, may be a value of 100, 25, or another suitable value. At this point, with respect to the chains of verification of FIG. 4, the counter is not equal to the preset limit. The counter may then be incremented (act 312).

The computing device may then determine one or more vouching entities that electronically vouch for the credential of a current entity, represented by node 402 and generates data corresponding to one or more corresponding nodes (at this point, nodes 404, 406) (act 314). The computing device may then select one of the one or more vouching entities and may adjust the counter to reflect a current depth of the chain (act 316). With respect to FIG. 4, the entity represented by node 404 is selected.

Each entity may have one or more codes associated therewith, each of which represents a subject matter associated with a credential of that entity. For example, if an entity claims to have a PhD in chemistry, then the entity may have a code associated therewith representing the subject matter "chemistry". Therefore, the computing device may then determine whether all of the one or more codes associated with the entity represented by node 402 are different from all of the one or more codes associated with the entity represented by node 404 or whether a loop or other conflict is detected (act 318). If either all of the one or more codes of the entity represented by node 402 fail to match any of the one or more codes of the entity represented by node 404, or the loop or other conflict is detected at the current entity represented by node 404, then the computing device may remove data corresponding to the current entity represented by node 404 and may remove a connection between the current entity represented by node 404 and the entity for which the current entity is vouching (node 402) (act 320; FIG. 3). Otherwise, the computing device may execute act 308 to determine whether the current node is one of the types of terminal nodes.

After performing act 320, the computing device may determine whether another entity outside of a current chain vouches for an earlier entity in the chain of verifications (act 322). If the computing device determines that another entity does vouch for the earlier entity (in FIG. 4, the entity represented by node 406 vouches for the entity represented by node 402), then act 316 may again be performed.

Assuming that entities represented by nodes 408, 410 and 412 have been processed and no other entities vouch for the entities represented by nodes 410 and 412, then, during act 322, the computing device may search earlier in the chain for an entity, represented by a node, that is vouched for by an entity outside of the current chain. With respect to FIG. 4, the computing device may determine that the entity represented by node 402 is such an entity. Node 406, which vouches for node 402, may then be selected and the counter may be adjusted to a depth level corresponding to the depth level of the determined entity (act 316). With respect to FIG. 4, the depth level of node 402 is 1. The computing device may then perform act 318 to determine whether all subject matters associated with node 402 fail to match a subject matter associated with node 406, representing a vouching entity for node 402, or whether a loop or other conflict is detected. If the subject matter associated with node 406 matches one of the subject matters of node 402, and no loop or other conflict is detected, then act 308 may be performed to determine whether node 406 is a type of terminal node. Assuming that node 406 is not a terminal node and the counter is not equal to the preset limit, then the computing device may perform act 312 to increment the counter because an entity corresponding to a node at a next depth level of a chain is about to be processed.

The computing device may continue to process nodes such as, for example, nodes 414, 416 and 418, representing entities in the chains until either a node in the chain is determined to be a type of terminal node or the counter for counting the depth level in the chain is determined to be equal to the preset limit.

If, during act 308, the computing device determines that a node is a type of terminal node, then the chain may be marked as verified (act 309) and processing may continue at act 322 to determine whether another entity represented by a node outside of a current chain, vouches for an entity appearing earlier in the current chain.

If, at act 310, the computing device determines that the counter equals the preset limit, then the computing device may mark the current chain as unverified (act 311) and the computing device may perform act 322 to determine whether another entity outside of the current chain vouches for an entity appearing earlier in the current chain. When processing is completed, each remaining chain will be marked as verified or unverified.

Figure 5:
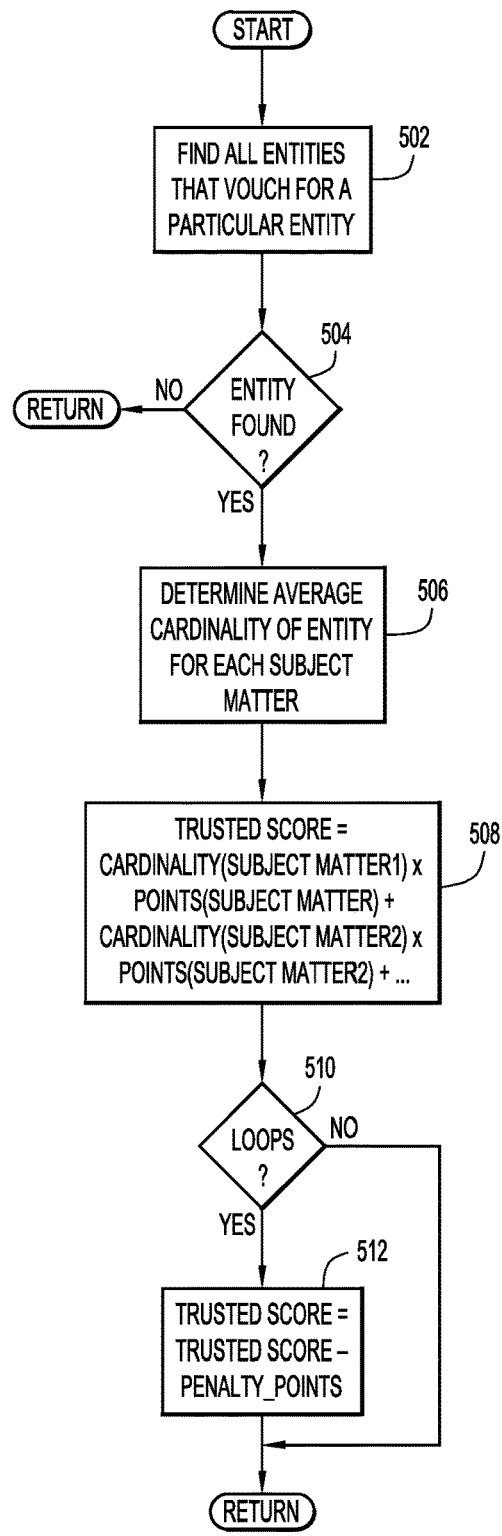
FIG. 5 is a flowchart of an example process for calculating a trusted score for an entity in an embodiment of the invention.

FIG. 5 is a flowchart of an example process for calculating a trust score of an entity in various embodiments of the invention. The process of FIG. 5 assumes that information regarding detected loops and conflicts is retained. The process may begin with a computing device such as, for example, server 104, computing device 106, or another computing device, finding all entities that vouch for a particular entity (act 502). A determination may be made regarding whether any vouching entities for the particular entity were found (act 504). If no vouching entities were found, then the process is completed and a trusted score of zero may be returned to a calling program. Otherwise, an average cardinality of the particular entity may be determined according to subject matter (act 506).

An average cardinality for an entity with respect to a particular subject matter may be determined by determining a cardinality, with respect to the particular subject matter, for each entity that vouches for the entity and then determining the average of those cardinalities. For example, if entity A is vouched for by entities B, C and D with respect to a particular subject matter, then entity A has a cardinality of 3 with respect to the particular subject matter. If entity B is vouched for by 3 entities for the particular subject matter, then entity B has a cardinality of 3 for the particular subject matter. If entity C is vouched for by 2 entities for the particular subject matter, then entity C has a cardinality of 2 for the particular subject matter. If entity D is vouched for by 1 entity for the particular subject matter, then entity D has a cardinality of 1 for the particular subject matter. Thus, entities B, C and D have respective cardinalities of 3, 2 and 1. Therefore, the average cardinality of entity A with respect to the particular subject matter would be equal to an average of the cardinalities of entities B, C and D, which in this example is 2.

The computing device may calculate an intermediate trusted score for an entity by summing each product of an average cardinality of the entity and a number of points with respect to each of the subject matters (act 508). Thus, for example, if a particular entity has an average cardinality of 3 with respect to subject matter 1, which has 5 points associated therewith, the particular entity has an average cardinality of 2 with respect to subject matter 2, which has 3 points associated therewith, and the particular entity has an average cardinality of 4 with respect to subject matter 3, which has 2 points associated therewith, and zero cardinality with respect to any other subject matters, then an intermediate trusted score would be equal to $(3\times5)+(2\times3)+(4\times2)=29$.

The computing device may then determine whether any loops or other conflict was previously detected in any chains that included the particular entity (act 510). If any loops or conflicts were detected, then a value of Penalty_Points may be subtracted from the intermediate trusted score to provide a final trusted score for the particular entity (act 512) and the process may be completed. If the computing device determines that no loops and no other conflicts were previously detected in any chains that included the particular entity, then the intermediate trusted score becomes the final trust score and the process may be completed.

In some embodiments, the value of Penalty_Points, with respect to calculating a trust score for a node, may be determined by calculating a portion of a trust score for the entity that is based on a vouching node for the entity that is included in a chain of verifications that has the detected loop or other conflict. For example, assume that all nodes in FIG. 4 are associated with a same single subject matter and that the subject matter has 3 points assigned thereto. Also, assume that a loop or other conflict is detected that involves node 412 and vouching nodes appearing after node 412 in a chain of verifications. Then the Penalty_Points, with respect to a trust score of node 402 may be equal to a portion of the trust score for node 402 that is based on node 404, which is included in the chain with the loop or the other conflict.

In this example, an intermediate trust score for node 402 may be determined, in act 508, as a sum of a product of an average cardinality of node 406 with points assigned to the subject matter and a product of an average cardinality of node 404 with the points assigned to the subject matter. Thus, the intermediate trust score for node 402 would be $(1\times3)+(1\times3)=6$. Node 404 is included in the chain that has the loop or the other conflict. Therefore, a value of Penalty_Points is that portion of the intermediate trusted score that includes a node from the chain having the loop or the other conflict. In this case, Penalty_Points is $(1\times3)$, which is 3. Therefore the final trust score for node 402 with respect to the subject matter is 6–3, which is 3 (act 512).

In this particular embodiment, a node having a trust score that exceeds a preset trusted value, with respect to a certain subject matter, may be considered to be a trusted entity or terminal node with respect to the certain subject matter when determining whether future chains are verified or unverified. The preset trusted value may be 100, 250, or another suitable value. With respect to FIGS. 3 and 4, if node 406 has a trust score that exceeds the preset trusted value for a certain subject matter, then an entity represented by node 406 would be considered to be a trusted entity, with respect to the certain subject matter, for future determinations of verified and unverified chains. Therefore, in this embodiment, act 308 of FIG. 3 may include a check to determine whether a node is to be considered a trusted or terminal node with respect to a certain subject matter.

The above-mentioned process for calculating a trusted score for a particular entity may differ in other embodiments. For example, in some embodiments, detecting loops or conflicts may not result in points being deducted from a trusted score for an entity. Further, in some embodiments, a same number of points may be assigned to each subject matter. A number of other methods for determining a trusted score for a particular entity may be implemented in other embodiments of the invention.

In some embodiments, computing devices 106 may be IoT devices. In such embodiments, a sensor network through which the IoT devices are connected may be utilized for verification purposes and may provide a paper free and integrated form of verification. Further, various entities may employ different methods to verify their respective credential. In various embodiments of the invention, data may be uniformly normalized in order to verify the data for various subject matters. The data may be normalized by systematically decomposing credential information to eliminate redundancy. For example, an individual may claim to have Bachelor of Science (B.S.) degrees in Electrical Engineering from two different universities in two different parts of the world. Some embodiments may have a standard way to represent credentials for each subject matter. As an example, a B.S. degree in Electrical Engineering may be broken down into course work and the course work may be broken down into a syllabus for comparison. Thus, a B.S. degree in Electrical Engineering from University A may be broken down into 120 credits of course work, 30 credits of which are for courses in the department of Electrical Engineering. Further, embodiments may determine whether University A is included in a list of accredited universities and a boolean value may be set to indicate whether the university is or is not included in the list. A B.S. degree in Electrical Engineering from University B may be broken down in a same manner. A database of degree types and majors for many universities and colleges and corresponding course work requirements may be maintained in some embodiments such that degrees in various majors may be broken down into course work requirements and school accreditation (or lack thereof) for comparison purposes. For voice verifications such as, for example, telephone conversations or recommendations, natural language processing and keyword searching may be used to uniformly normalize the voice verifications.

The environment of the present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A machine-implemented method of verifying a credential of an entity, the machine-implemented method comprising:
   identifying, by a computing device, a credential of a first entity;
   determining, by the computing device, one or more second entities, each electronically verifying the credential of the first entity;
   determining, by the computing device, one or more third entities, each electronically verifying one or more from a group of the second entities and other ones of the third entities, wherein the second and third entities form a set of chains of verification from the first entity;
   generating, by the computing device, data corresponding to a graphical representation including nodes representing respective credentials of the second entities and the third entities, wherein the nodes are connected to form paths representing the set of chains of verification, the data corresponding to the graphical representation including information regarding connections between the nodes, each of the nodes having one or more codes, and each code of the one or more codes representing a respective subject matter, each respective entity corresponding to a respective node being permitted to verify only other respective entities corresponding to other respective nodes having at least one code that matches the at least one code of the respective node;

analyzing, by the computing device, the set of chains of verification to detect one or more loops or other conflicts within the set of chains among the second and third entities; and generating, by the computing device, a verification of the credential based on detection of a trusted entity within one of the set of chains and failure to detect a loop and a conflict within the one of the set of chains.

2. The machine-implemented method of claim 1, wherein the generating of the verification comprises:
determining a trust score for the entity.

3. The machine-implemented method of claim 1, wherein the analyzing of the set of chains of verification comprises:
analyzing the data for the paths to detect one or more loops or other conflicts among nodes representing the respective credentials of the second entities and the third entities.

4. The machine-implemented method of claim 3, wherein the data corresponding to the graphical representation includes information corresponding to one or more terminal nodes, each of the one or more terminal nodes representing one of an entity recognized for providing valid verification of the credential and an entity providing a verification of the credential which has been pre-designated as valid.

5. The machine-implemented method of claim 3, wherein the generating of the data corresponding to the graphical representation comprises:
removing information representing a connection from the graphical representation in response to a code of the connection not residing within the associated one or more codes of a corresponding node.

6. The machine-implemented method of claim 3, further comprising:
normalizing data of the nodes to normalize and verify the subject matter and a code of the connections and the associated one or more codes of the nodes.

7. The machine-implemented method of claim 1, wherein the first entity corresponds to one of a person, an organization, a certifiable object, and an Internet of Things (IOT) device.

8. A computing system for verifying credentials of an entity, the computing system comprising:
at least one processor; and
at least one memory connected to the at least one processor, wherein the at least one processor is configured to perform:
identifying a credential of a first entity;
determining one or more second entities, each electronically verifying the credential of the first entity;
determining one or more third entities, each electronically verifying one or more from a group of the second entities and other ones of the third entities, wherein the second and third entities form a set of chains of verification from the first entity;
generating data corresponding to a graphical representation including nodes representing respective credentials of the second entities and the third entities, wherein the nodes are connected to form paths representing the set of chains of verification, the data corresponding to the graphical representation including information regarding connections between the nodes, each of the nodes having one or more codes, and each code of the one or more codes representing a respective subject matter, each respective entity corresponding to a respective node being permitted to verify only other respective entities corresponding to other respective nodes having at least one code that matches the at least one code of the respective node;

analyzing the set of chains of verification to detect one or more loops or other conflicts within the chains among the second and third entities; and generating a verification of the credential based on detection of a trusted entity within one of the set of chains and failure to detect a loop or a conflict within the one of the set of chains.

9. The computing system of claim 8, wherein the generating of the verification comprises:
determining a trust score for the entity.

10. The computing system of claim 8,
wherein the analyzing of the set of chains of verification comprises:
analyzing the data for the paths to detect one or more loops or other conflicts among nodes representing the second entities and the third entities.

11. The computing system of claim 10, wherein the data corresponding to the graphical representation includes information corresponding to one or more terminal nodes, each of the one or more terminal nodes representing one of an entity recognized for providing valid verification of the credential and an entity providing a verification of the credential which has been pre-designated as valid.

12. The computing system of claim 10, wherein the generating of the data corresponding to the graphical representation comprises:
removing information representing a connection from the graphical representation in response to a code of the connection not residing within the associated one or more codes of a corresponding node.

13. The computing system of claim 10, wherein:
the at least one processor is further configured to perform:
normalizing data of the nodes to normalize and verify the subject matter and a code of the connections and the associated one or more codes of the nodes; and
the first entity is one of a person, an organization, a certifiable object, and an Internet of Things (IOT) device.

14. A computer program product comprising:
at least one computer readable storage medium having computer readable program code embodied therewith for execution on at least one processor, the computer readable program code being configured to be executed by the at least one processor to perform:
identifying a credential of a first entity;
determining one or more second entities, each electronically verifying the credential of the first entity;
determining one or more third entities, each electronically verifying one or more from a group of the second entities and other ones of the third entities, wherein the second and third entities form a set of chains of verification from the first entity;
generating data corresponding to a graphical representation including nodes representing respective credentials of the second entities and the third entities, wherein the nodes are connected to form paths representing the set of chains of verification, the data corresponding to the graphical representation including information regarding connections between the nodes, each of the nodes having one or more codes, and each code of the one or more codes representing a respective subject matter, each respective entity corresponding to a respective node being permitted to verify only other respective entities corresponding to other respective nodes having at least one code that matches the at least one code of the respective node;

analyzing the set of chains of verification to detect one or more loops or other conflicts within the chains among the second and third entities; and generating a verification of the credential based on detection of a trusted entity within one of the set of chains and failure to detect a loop or other conflict within the one of the set of chains.

15. The computer program product of claim 14, wherein the generating of the verification comprises:

determining a trust score based for the entity based on detecting at least one loop within the chains of verification.

16. The computer program product of claim 14, wherein the analyzing of the set of chains of verification comprises:

analyzing the data for the paths to detect one or more loops or other conflicts among nodes representing the respective credentials of the second entities and the third entities.

17. The computer program product of claim 16, wherein the data corresponding to the graphical representation includes information corresponding to one or more terminal nodes, each of the one or more terminal nodes representing one of an entity recognized for providing valid verification of the credential and an entity providing a verification of the credential which has been pre-designated as valid.

18. The computer program product of claim 16, wherein:

the generating of the data corresponding to the graphical representation comprises:

removing information representing a connection from the graphical representation in response to a code of the connection not residing within the associated one or more codes of a corresponding node; and the computer readable program code is configured to be executed by the at least one processor to perform:

normalizing data of the nodes to normalize and verify the subject matter and code of the connections and the associated one or more codes of the nodes; and the first entity is one of a person, an organization, a certifiable object, and an Internet of Things (IOT) device.

* * * * *